(12) United States Patent
Salvador et al.

(10) Patent No.: US 9,406,108 B2
(45) Date of Patent: Aug. 2, 2016

(54) DEBLURRING OF AN IMAGE FROM A SEQUENCE OF IMAGES

(71) Applicant: THOMSON LICENSING, Issy de Moulineaux (FR)

(72) Inventors: Jordi Salvador, Hamburg (DE); Axel Kochale, Springe (DE); Siegfried Schweidler, Gehrden (DE)

(73) Assignee: THOMSON LICENSING, Issy-les Moulineaux (FR)

( * ) Notice: Subject to any disclaimer, the term of this patent is extended or adjusted under 35 U.S.C. 154(b) by 81 days.

(21) Appl. No.: 14/192,850

(22) Filed: Feb. 27, 2014

(65) Prior Publication Data

US 2014/0254951 A1 Sep. 11, 2014

(30) Foreign Application Priority Data

Mar. 6, 2013 (EP) .................................... 13305251

(51) Int. Cl.
*G06T 5/00* (2006.01)
*G06T 7/20* (2006.01)

(52) U.S. Cl.
CPC . *G06T 5/003* (2013.01); *G06T 7/20* (2013.01); *G06T 2207/20201* (2013.01)

(58) Field of Classification Search
USPC .................................. 382/255, 274, 275, 276
See application file for complete search history.

(56) References Cited

U.S. PATENT DOCUMENTS

| 7,440,634 | B2 | 10/2008 | Ben-Ezra et al. | |
|---|---|---|---|---|
| 8,428,390 | B2 * | 4/2013 | Li et al. | 382/274 |
| 2010/0329582 | A1 * | 12/2010 | Albu et al. | 382/255 |
| 2011/0122296 | A1 | 5/2011 | Liu | |
| 2011/0304687 | A1 | 12/2011 | Joshi et al. | |

FOREIGN PATENT DOCUMENTS

| WO | WO9219068 | 10/1992 |
|---|---|---|
| WO | WO2010118629 | 10/2010 |

OTHER PUBLICATIONS

McCloskey, S., "Velocity-Dependent Shutter Sequences for Motion Deblurring", 11th European Conference on Computer Vision, Crete, Greece, Sep. 5, 2010, pp. 1-14.
Cho et al., "Fast Motion Deblurring", ACM Transactions on Graphics, vol. 28, No. 5, Dec. 2009, pp. 1-8.
Lee et al., "Simultaneous Localization mapping and deblurring", 2011 IEEE International Conference on Computer Vision (ICCV 2011), Barcelona, Spain, Nov. 6, 2011, pp. 1203-1210.
Sunghyun Cho et al: "Removing Non-Uniform Motion Blur from Images" Computer Vision, 2007. ICCV 2007. IEEE11th International Conference 0 N, IEEE, PI ,Oct. 2007, pp. 1-8.

(Continued)

*Primary Examiner* — Duy M Dang
(74) *Attorney, Agent, or Firm* — Tutunjian & Bitetto, P.C.

(57) ABSTRACT

A method and an apparatus for deblurring an image from a sequence of images are described. The image comprises pixels. A motion estimation stage estimates motion of the pixels of the image. A point spread function modeling stage models point spread functions for the pixels of the image using the motion estimates. A deconvolution stage determines a deblurred estimate of the image using the modeled point spread functions. A feedback loop allows iteratively improving the motion estimates for the pixels until the modeled point spread functions converge.

21 Claims, 6 Drawing Sheets

(56) References Cited

OTHER PUBLICATIONS

Dong-Bok Lee etal_Video Deblurring Algorithm Using Accurate Blur Kernel Estimation and Residual Deconvolution based on a Blurred-Unblurred Fame Pair, IEEE Transactions on Image Processing, vol. 22, No. 3, pp. 926-940, Mar. 2013.

Roy Wang_etal_A confidence measure based moving object extraction system built for compressed domain, Circuits and Systems, 2000. The 2000 IEEE Intl Symposium on May 28-31, 2000, Piscataway, NJ,USA, IEEE, vol. 5, pp. 21-24.

Michael Hirsch et al.: "Fast Removal of Non-uniform Camera Shake", IEEE Int. Conf. on Computer Vision (ICCV) 2011, pp. 463-470.

Neel Joshi, Richard Szeliski, David J. Kriegman, "PSF Estimation using Sharp Edge Prediction", IEEE Conf. on Computer Vision and Pattern Recognition (CVPR) 2008, pp. 1-8.

Qi Shan et al.: "High-quality Motion Deblurring from a Single Image", ACM Transactions on Graphics (Proceedings of SIGGRAPH 2008), vol. 27 (2008), pp. 73:1-73:10.

Deqing Sun, Stefan Roth, Michael J. Black, "Secrets of optical flow estimation and their principles", IEEE Conf. on Computer Vision and Pattern Recognition (CVPR) 2010, pp. 2432-2439.

Oliver Whyte et al.: "Non-uniform Deblurring for Shaken Images", IEEE Conf. on Computer Vision and Pattern Recognition (CVPR) 2010, pp. 491-498.

Li Xu et al.: "Depth-Aware Motion Deblurring", Int. Conf. on Computational Photography 2012, pp. 1-8.

Search Report Dated Aug. 5, 2013.

* cited by examiner

DEBLURRING OF AN IMAGE FROM A SEQUENCE OF IMAGES

This application claims the benefit, under 35 U.S.C. §119 of European Patent Application 13305251.4, filed Mar. 6, 2013.

FIELD OF THE INVENTION

The invention relates to a method and an apparatus for deblurring an image from a sequence of images. More specifically, the invention relates to a method and an apparatus for reducing the image blur of fast moving objects captured by standard video cameras.

BACKGROUND OF THE INVENTION

In video processing motion blur often constitutes a problem, especially motion blur on fast moving objects. For example, for frame-rate up-conversion well-defined shapes, which are free from motion blur, are much easier to match across frames. This leads to better time-interpolated frames. Also for simulations of virtual cameras based on real images deblurred frames are important, as the original blur will typically not match the camera motion of the simulated virtual camera.

In S. Cho et al.: "*Removing Non-Uniform Motion Blur from Images*", IEEE Int. Conf. on Computer Vision (ICCV) 2007, pp. 1-8, a method is presented for removing non-uniform motion blur from a set of blurred images. This method is parameterized by the number of possible motions within the image. Thus, prior to the removal of motion blur, the number of rigidly moving image regions must be known. Unfortunately, this is not reasonable in a real-world video deblurring scenario.

For cases where the image blur slowly varies across the image, e.g. when the observed scene motion is not fronto-parallel to the camera's image plane or the whole scene shows rigid motion with respect to the camera, a number of techniques are capable of obtaining accurate estimates of the slowly spatially varying Point Spread Function (PSF), even from just a single image. These techniques include the works of Q. Shan et al.: "*High-quality Motion Deblurring from a Single Image*", ACM Transactions on Graphics (Proceedings of SIGGRAPH 2008), Vol. 27 (2008), pp. 73:1-73:10, O. Whyte et al.: "*Non-uniform Deblurring for Shaken Images*", IEEE Conf. on Computer Vision and Pattern Recognition (CVPR) 2010, pp. 491-498, M. Hirsch et al.: "*Fast Removal of Non-uniform Camera Shake*", IEEE Int. Conf. on Computer Vision (ICCV) 2011, pp. 463-470, and L. Xu et al.: "*Depth-Aware Motion Deblurring*", Int. Conf. on Computational Photography 2012, pp. 1-8. The latter shows the specificity that the estimation of the spatially varying PSF is driven by the knowledge about the scene's depth in stereo setups.

None of the approaches described in the above identified publications is capable of estimating the various and localized types of motion blur that can occur simultaneously when a camera with slow shutter speed captures events with fast motion, such as a sports event with players moving in a variety of directions with a fast speed.

SUMMARY OF THE INVENTION

It is an object of the present invention to propose an improved solution for deblurring an image from a sequence of images.

According to the invention, a method for deblurring an image from a sequence of images, the image comprising pixels, comprises the steps of:
  estimating motion of the pixels of the image;
  modeling point spread functions for the pixels of the image using the motion estimates;
  determining a deblurred estimate of the image using the modeled point spread functions; and
  iteratively improving the motion estimates for the pixels until the modeled point spread functions converge.

Accordingly, an apparatus for deblurring an image from a sequence of images, the image comprising pixels, comprises:
  a motion estimation stage for estimating motion of the pixels of the image;
  a point spread function modeling stage for modeling point spread functions for the pixels of the image using the motion estimates;
  a deconvolution stage for determining a deblurred estimate of the image using the modeled point spread functions; and
  a feedback loop for iteratively improving the motion estimates for the pixels until the modeled point spread functions converge.

Also, a non-transitory computer readable storage medium has stored therein instructions enabling deblurring of an image from a sequence of images, the image comprising pixels, which when executed by a computer, cause the computer to:
  estimate motion of the pixels of the image;
  model point spread functions for the pixels of the image using the motion estimates;
  determine a deblurred estimate of the image using the modeled point spread functions; and
  iteratively improve the motion estimates for the pixels until the modeled point spread functions converge.

The present invention proposes an improved solution for deblurring an image from a sequence of images. The motion of each pixel in each video frame in a video sequence is robustly estimated by block matching using the two temporally neighboring frames and by posterior filtering with a temporal coherence filter, a median filter, and a low-pass filter. The estimated motion is used for modeling the spatially varying PSF for each pixel. Using the PSFs a deblurred estimate is obtained from the input frame and the motion estimate of each pixel is improved, preferably by back-projecting the deblurred estimate of the image, until the spatially varying PSF estimate converges under a set of rules.

In contrast to existing techniques, the proposed solution is able to handle cases where an unknown or unlimited amount of motion blur artifacts in any direction and magnitude are present. The presented approach succeeds at retrieving a plausible estimate of the desired sharp image in video sequences with an undetermined number of independently moving objects. The resulting video frames, for which the (severe) motion blur has been corrected, appear sharper, with better defined contours around the moving objects, regardless of the number of motion directions causing blur in the captured scene. These deblurred images can then be used for further processing, e.g. to generate an appealing simulation of a real camera when navigating around a video panorama with a virtual camera. The synthesized blur due to the virtual camera's motion can be applied to objects moving in directions not parallel to the virtual camera motion, whereas the objects moving parallel to the camera motion are shown deblurred. The deblurred frames are also useful for frame-rate up-conversion and scan conversion. Well-defined shapes, with reduced motion blur, are easier to match across frames and lead to better time-interpolated frames. The solution according to the invention will typically be implemented in professional studio or post-processing equipment. However, it may likewise be implemented in consumer equipment, e.g. in a set-top box or as a video processing software running on a personal computer.

BRIEF DESCRIPTION OF THE DRAWINGS

For a better understanding the invention shall now be explained in more detail in the following description with reference to the figures. It is understood that the invention is not limited to this exemplary embodiment and that specified features can also be expediently combined and/or modified without departing from the scope of the present invention as defined in the appended claims.

DETAILED DESCRIPTION OF PREFERRED EMBODIMENTS

Although in the following description the process of deblurring each frame is considered in a global manner, i.e. the whole image is treated as a single block, a possible alternative implementation would first split the frames into small overlapping blocks, proceed with the proposed method for each block, and then recompose the deblurred frame.

Figure 1:
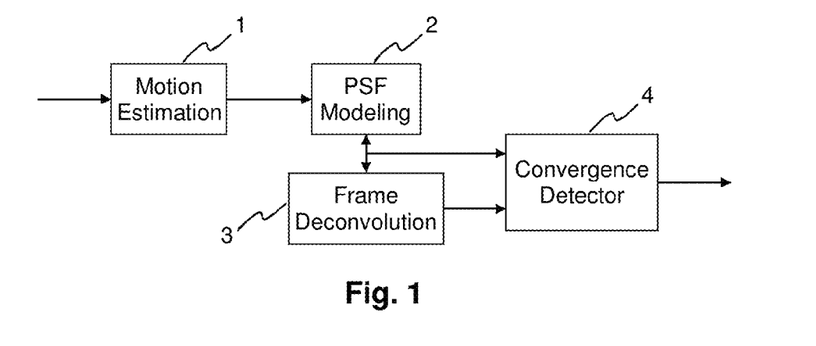
FIG. 1 schematically illustrates a block diagram of an apparatus according to the invention.

A schematic overview of an apparatus according to the invention for video deblurring is illustrated in FIG. 1. The basic composing blocks are a motion estimation stage 1, where the apparent motion of each pixel is estimated, a PSF modeling stage 2, where the estimated motion is used to generate an estimate of the spatially varying point spread function, a frame deconvolution stage 3, where the estimated PSF is used for deconvolving the current frame, and a convergence detection stage 4, where the deblurred frame is accepted when the PSF model converges. As mentioned, the proposed method is individually applied to each frame of a video sequence. The only stage at which the information of several frames is combined is the initial motion estimation stage 1.

In the following a detailed descriptions of each involved stage shall be provided.

Figure 2:
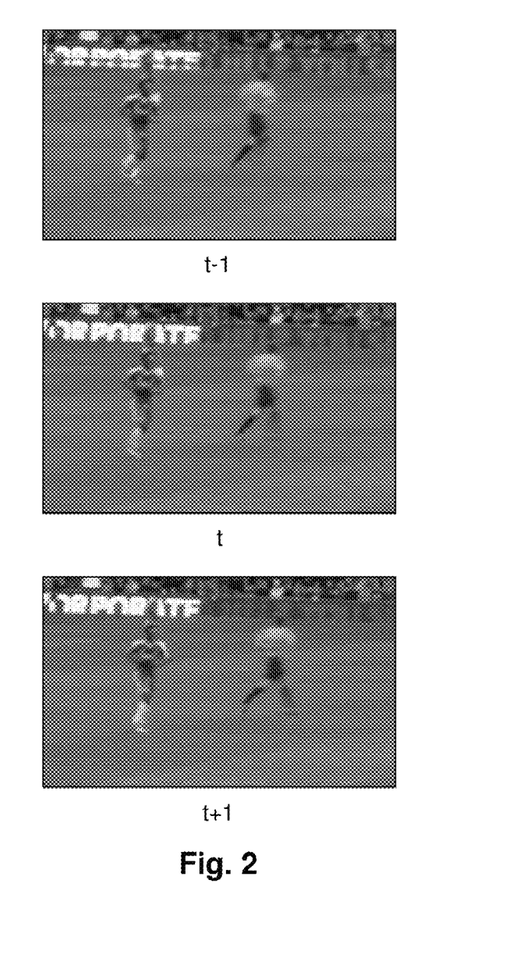
FIG. 2 shows three frames of a short motion-blurred video sequence.

The main goal of the motion estimation stage 1 stage is to provide robust motion estimates for video frames with severe motion blur artifacts. It would seem logical to choose one of the top performing state-of-the-art approaches for optical flow estimation, like D. Sun et al.: "*Secrets of optical flow estimation and their principles*", IEEE Conf. on Computer Vision and Pattern Recognition (CVPR) 2010, pp. 2432-2439, in order to estimate the per-pixel motion of each video frame. However, this type of motion estimation method does not correctly handle severely blurred images. An example of such severely blurred images is depicted in FIG. 2, which shows three consecutive blurred input frames of a short motion-blurred video sequence. The fast moving leg of the player on the right side of the frames is severely blurred. The frames also illustrate that there are different degrees of blur related to objects with different speed relative to the camera's image plane.

For the above mentioned state-of-the-art optical flow estimation method data measurements are pixel-wise instead of block-wise. When the method is applied to the pairs of frames t−1 and t and t and t+1 of FIG. 2, the severe distortion caused by motion blur and the large degree of disparity of small independently moving elements, e.g. the fast moving leg with respect to both the background and the slower moving body, make this approach underestimate the speed of locally fast moving elements.

Figure 3:
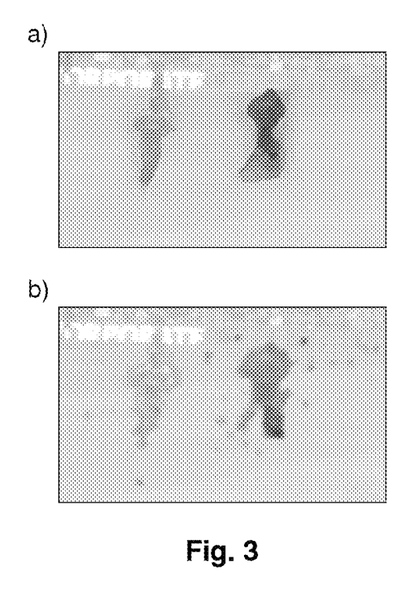
FIG. 3 shows overlays of a video frame and the grey value encoded estimated motion field.

FIG. 3 shows an overlay of the grey value-encoded estimated motion field for the frame t and the original image for both the above mentioned state-of-the-art optical flow estimation method (FIG. 3a)) and the method proposed in the following description (FIG. 3b)). The darkest grey values should be found for the fastest moving parts, e.g. the fast moving leg of the player to the right. As can be seen, in case of the optical flow-based approach the darkest grey values are found for the upper body of the player to right. In contrast, in case of the method proposed herein the darkest grey values are found for the actual fastest moving part of the scene, i.e. the fast moving leg and foot.

Figure 4:
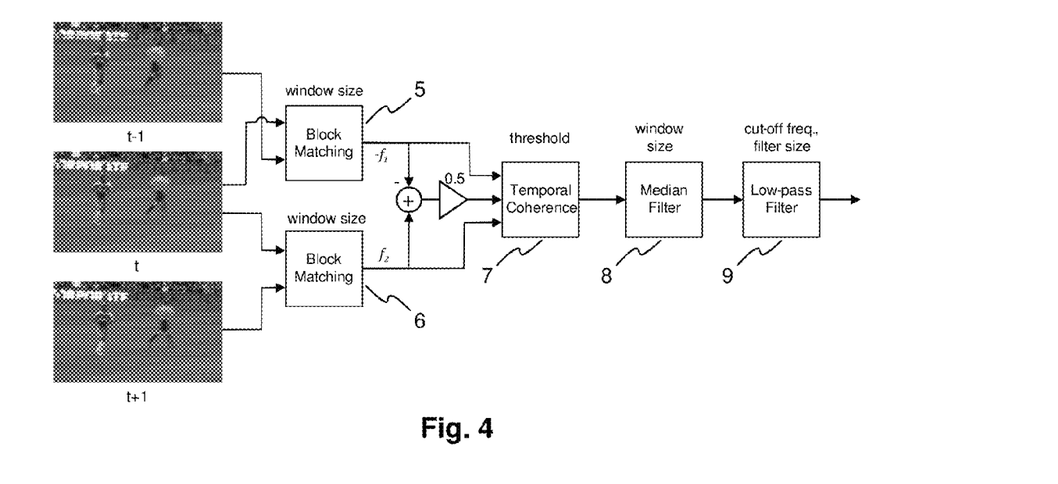
FIG. 4 shows a block diagram of a motion estimation method used for implementing a method according to the invention.

The proposed approach uses a more robust data fidelity measure, namely block-matching, than the one considered in the optical flow approach. Furthermore, a number of post-processing stages are applied in order to better condition the estimated motion blur. The complete block diagram of the proposed motion estimation method is shown in FIG. 4. Motion estimation is based on three consecutive video frames. A block matching algorithm obtains the initial estimates for each pair of consecutive frames with two block matching stages 5, 6. These are combined by averaging them. Then, a non-linear temporal coherence filter 7 removes non-parallel motion estimates, a spatial median filter 8 removes isolated outliers and a final low-pass filter 9 provides a smooth output motion field.

While the block diagram in FIG. 4 already provides a sufficient description of most of the involved sub-stages, i.e. block matching 5, 6, median filters 8 and low-pass filters 9 are well known, special attention has to be given to the temporal coherence filter 7. As shown in FIG. 4, this non-linear filter receives the pre-flow $-f_1$, the post-flow, and the combined flow $$f = \frac{f_1 + f_2}{2}.$$

Then, the response of this temporal filter, $f_0$, is $$f_0 = \begin{cases} 0 & \langle f_1, f_2 \rangle < \tau(\|f_1\|_2^2 + \|f_2\|_2^2) \\ f & \langle f_1, f_2 \rangle \geq \tau(\|f_1\|_2^2 + \|f_2\|_2^2), \end{cases} \quad (1)$$

where τ is a threshold that sets the tolerance to dissimilarity between the two available motion estimates for each pixel and $\langle,\rangle$ is the dot product. When a time-consistent motion estimate cannot be obtained, the actual velocity might be non-constant, or the level of noise too high, so it is preferable not to account for these pixels and to set their estimated motion to zero.

Figure 5:
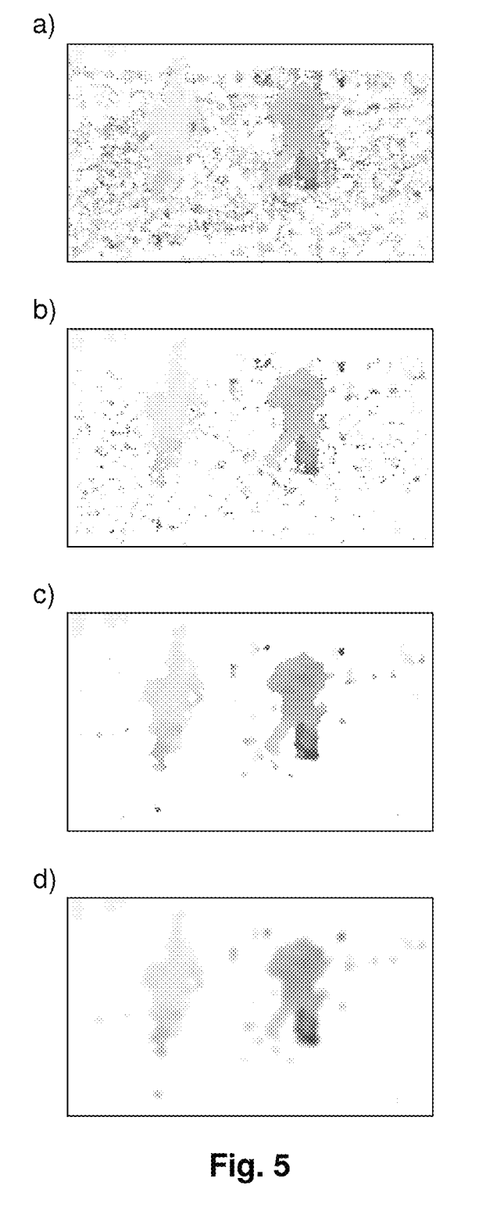
FIG. 5 shows estimated motion fields output by the different stages of FIG. 4.

FIGS. 5a) to d) show exemplary motion estimates after each post-processing stage, namely after block matching and averaging (FIG. 5a)), after the temporal coherence filter (FIG. 5b)), after the spatial median filter (FIG. 5c)), and after the spatial low-pass filter (FIG. 5d)). As can be seen, the temporal coherence filter shows the most dramatic influence on the improvement of the initial motion estimate.

A complete realization of the proposed motion estimation stage can be obtained by setting the block matching window size to 41 pixels, the temporal coherence tolerance threshold to ¼, the median filter window size to 5×5 pixels and the normalized cut-off frequency and size of the low-pass filter to ¼ and 16×16 pixels, respectively. These parameters were employed for obtaining the results illustrated in FIG. 5.

Concerning the PSF modeling stage 2, the PSF corresponding to each pixel is modeled as a symmetric linear motion blur kernel, with the direction of the estimated motion vector and proportional magnitude. The only adjustable parameter is the scaling factor of the magnitude. This is closely related to the shutter time of the video camera. If the camera shutter is open during e.g. one quarter of the inverse of the frame-rate, the scaling factor must be set to this ratio between the shutter time and the total time slot for each frame. This corresponds to the assumption that motion is constant during the time corresponding to a frame, which is reasonable at high frame-rates.

Figure 6:
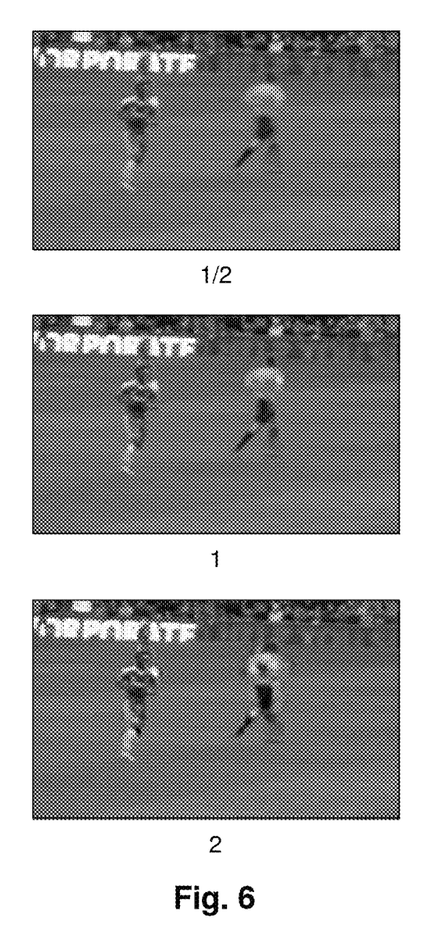
FIG. 6 illustrates the effect of setting a magnitude scaling factor to different values.

In FIG. 6 the effect of setting the scaling factor to different values is shown. It can be observed that, for the processed video sequence, the shutter appears to be open during the whole duration of the frame. Noteworthy are the plausibly deblurred moving elements when the parameter equals 1.

Figure 7:
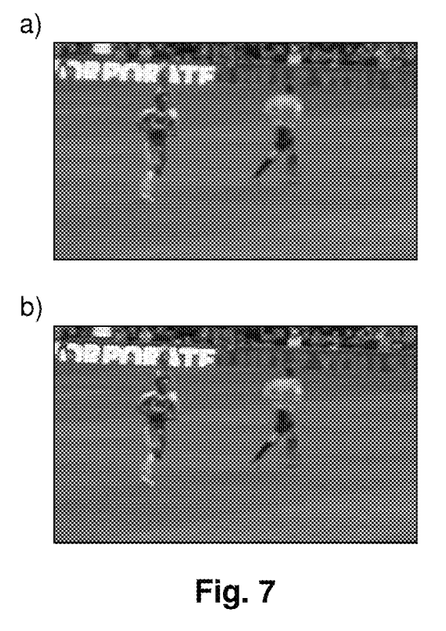
FIG. 7 shows deconvolved images obtained by considering only motion blur respectively motion blur and lens blur in combination.

Additionally, also the lens blur can be modeled, even for regions where no motion is present. Typically, lens blur can be modeled as a disk kernel with radius ρ, where only the pixels inside the disk are set to one and the rest is set to zero, with pixels lying on the border of the disk having a weight proportional to the area of the disk they intersect. A comparison between the deblurred images is shown in FIG. 7. FIG. 7a) shows the deconvolved image obtained by considering only motion blur. FIG. 7b) shows the deconvolved image obtained considering both motion blur and added lens blur, with ρ=1. The model including lens blur results in an increased level of sharpness. Although slight variations across the image might exist, a spatially invariant kernel plausibly approximates the actual lens blur. Otherwise, techniques like the one presented in N. Joshi et al.: "*PSF Estimation using Sharp Edge Prediction*", IEEE Conf. on Computer Vision and Pattern Recognition (CVPR) 2008, pp. 1-8, may also be applied.

Regarding frame deconvolution, the image formation model $$y(p)=h(s,p)\cdot b(p)\cdot x(p)+n(p) \quad (2)$$

is considered, where h(s,p) is the spatially varying motion blur kernel, b(p) is the spatially invariant lens blur, x(p) is the latent sharp image to recover, and n(p) is independent and identically distributed additive white Gaussian noise.

Then, using a matrix formulation with both images and noise vectorized by stacking them in a single column vector, this model can be expressed as y=HBx+n, where H and B are sparse square matrices. Given H and B, a least squares estimator of the latent sharp image x is $$\tilde{x} := \underset{x}{\operatorname{argmin}} \|y - HBx\|_2^2. \quad (3)$$

Note that $\|x\|_p = \sqrt[p]{\sum_{\forall i} |x_i|^p}$, where $\{x_i\}$ are the elements of vector x. In order to improve the conditioning of the problem, as H and B may contain errors, a more robust strategy is followed, which introduces prior knowledge about the image formation model. This means that the latent image must be smooth but still contain sharp borders. Thus, the deconvolution process is reformulated as $$\tilde{x} := \underset{x}{\operatorname{argmin}} \Big\{ \|y - HBx\|_2^2 + \lambda_1 \underbrace{\|\Delta x\|_2^2}_{smoothness} + \lambda_2 \underbrace{\|\nabla x\|_1}_{sharp\ borders} \Big\}, \quad (4)$$

where the smoothness prior is expressed as a Tikhonov regularizer with a second derivative (Laplacian) and the sharpness preserving term is an anisotropic Total Variation regularizer. The factors $\lambda_1$, with typical values in the range from $10^{-2}$ to $10^{-1}$, and $\lambda_2$, with values between $10^{-3}$ and $10^{-2}$, are the respective regularization weights.

The chosen algorithm to solve this problem is a gradient descent approach with a predefined varying step size $\mu^t$. This step size is defined to be large during the first iterations, when the output image x is still far from the optimum, and small during the last iterations, when only small adjustments are necessary to converge at the optimal image. More specifically, possible initial ($\mu^0$) and final ($\mu^f$) values for $\mu^t$ are 1 and 0.01. In the experiments, these values were used as initial and final step sizes during 500 iterations. The step size is updated as $$\mu^t := {}^{N_{ite}-1}\!\!\sqrt{\frac{\mu^f}{\mu^0}}\, \mu^{t-1}, \quad (5)$$

where $N_{ite}$ is the desired number of iterations. The gradient of the complete functional described above is computed as $$\nabla^t = 2B^T H^T HBx^t - 2B^T H^T y + 2\lambda_1 L^T Lx^t + \lambda_2 (D_u^T \operatorname{sign}(D_u x^t) + D_v^T \operatorname{sign}(D_v x^t)), \quad (6)$$

where $D_u$ and $D_v$ are two linear operators performing the horizontal and vertical gradients (forward differences) and L is a linear operator performing the Laplacian ($L=D_u^T D_u + D_v^T D_v$). The gradient is normalized before updating the output image. Note that a capital T denotes a matrix transposition operation, whereas a lowercase t denotes the current iteration. The resulting iteration is $$\tilde{x}^{t+1} := \tilde{x}^t - \mu^t \frac{\nabla^t}{\|\nabla^t\|_2}. \quad (7)$$

With this iteration, the magnitude of the variation in the estimated sharp image is entirely defined by the predefined update step $\mu^t$, whereas the direction of the applied changes is defined by the functional gradient. The output of this stage is the deblurred image x.

When the deblurred image x is obtained, it is filtered with the blur matrices B and H (back-projection). Ideally, the resulting image would closely resemble the blurred image y, assuming a typically low level of additive noise. Due to modeling errors, some pixels in HBx largely deviate from the corresponding value in y. Therefore, the PSF modeling stage 2 and the frame deconvolution stage 3 are iteratively applied until iterative back-projection reaches convergence according to the following rules, which are applied in the convergence detection stage 4:

1. A tolerance threshold of 2 bit out of the total 8 bit per component is set, i.e. differences smaller than 4 are within the tolerance threshold and thus ignored.
2. When the difference affects the 3rd LSB (Least Significant Bit) and beyond, the pixel blur model's magnitude is reduced by one unit, if its magnitude is larger than or equal to two.
3. When all wrong pixel's motion blur magnitude is smaller than 2, or no pixel shows a difference above the tolerance threshold, the convergence detector outputs the deblurred image x and terminates the iterative back-projection.

Application of a full iterative back-projection scheme would suffer from the problem of not being able to generate a complete prediction of H at every stage, due to the sparse available amount of data. However, relaxing this to a heuristic behavior, built upon the assumption that errors are only due to overestimation of the pixel's motion magnitude, allows effectively improving the blur model without introducing further regularizers and complexity.

Figure 8:
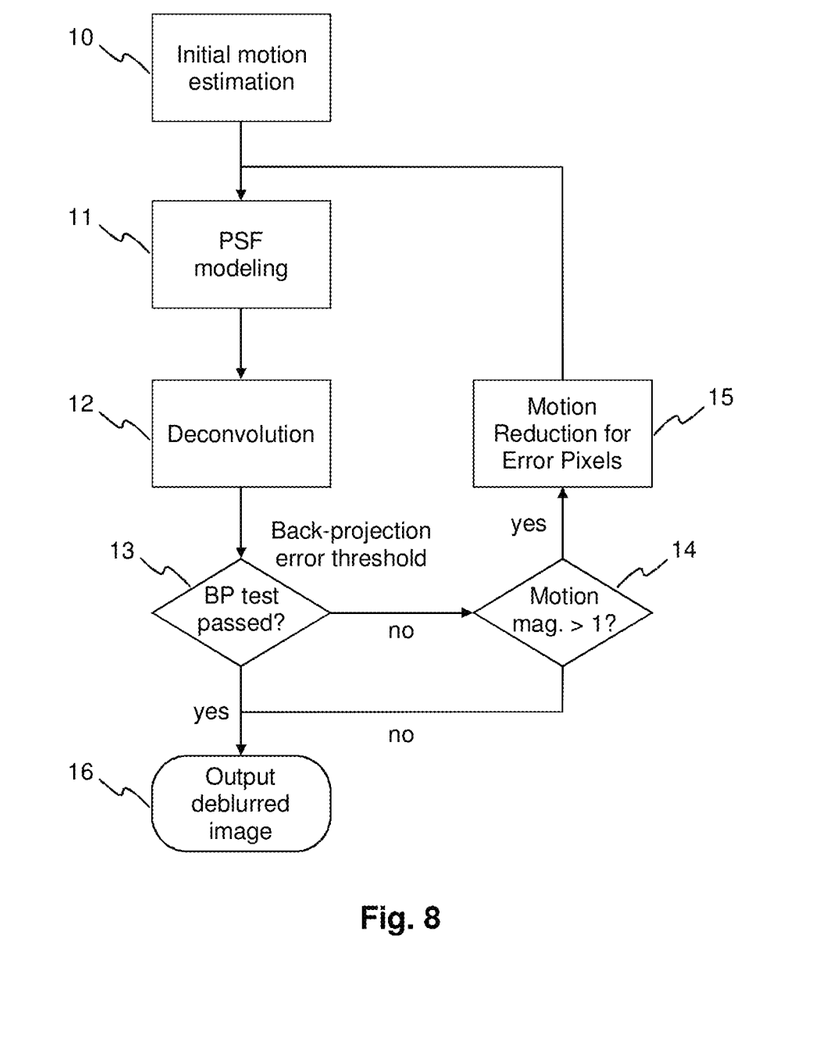
FIG. 8 visualizes an approach for motion and deblurring optimization based on back-projection test and model refinement with convergence detection.

This is used in an iterative manner, as shown in FIG. 8. After an initial motion estimation 10 the PSF is modeled 11 based on the detected motion information. Then this model is used to deblur 12 the image. Back-projection is used to measure the errors. If tests 13, 14 yield that the errors are below the threshold or the model does not allow further reduction of the motion magnitude for pixels with errors, the method terminates and the deblurred image is output 16. Otherwise, the motion's magnitude of each pixel is reduced 15 by one unit and the method goes back to the PSF modeling step 11.

Figure 9:
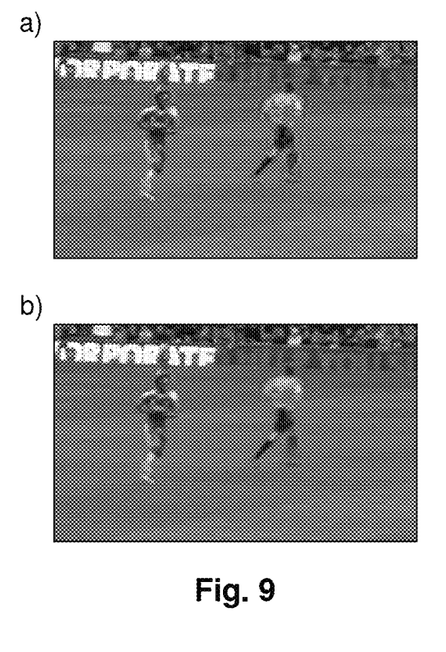
FIG. 9 shows an initial and a final deblurred image.

In practice a small number of iterations, e.g. 5 to 10 iteration, suffices to obtain a suitable deblurred image. In FIG. 9, the initial deblurred image (FIG. 9*a*)) with severe back-projection errors and the final deblurred image (FIG. 9*a*)) are shown, where convergence is reached after only five iterations. As can be seen, the PSF model refinement actually allows reducing the amount of artifacts around contours, where motion estimation is prone to include more errors.

The invention claimed is:

1. A method for deblurring an image from a sequence of images, the image comprising pixels, the method comprising:
   determining motion estimates of the pixels of the image;
   modeling point spread functions for the pixels of the image using the determined motion estimates;
   determining a deblurred estimate of the image using the modeled point spread functions; and
   iteratively improving the determined motion estimates for the pixels by reducing a pixel's blur model magnitude by one unit in each direction until the modeled point spread functions converge.

2. The method according to claim 1, wherein determining motion estimates of the pixels of the image further comprises:
   applying a block matching algorithm to the image and temporally neighboring images from the sequence of images; and
   removing non-parallel motion estimates with a temporal coherence filter, said removing comprising comparing a dot product of a pixel's motion estimates relative to a temporally preceding image and a temporally successive image with Euclidean norms of those motion estimates.

3. The method according to claim 2, wherein an output of the temporal coherence filter is '0' if the dot product of a pixel's determined motion estimates is smaller than a sum of the squared Euclidean norms of those motion estimates multiplied by a threshold, and wherein the output is half the sum of those motion estimates otherwise.

4. The method according to claim 1, wherein determining motion estimates of the pixels of the image comprises eliminating noise from the motion estimates with a median filter.

5. The method according to claim 1, wherein determining motion estimates of the pixels of the image comprises smoothing an output motion field with a low-pass filter.

6. The method according to claim 1, wherein improving the determined motion estimates for the pixels comprises back-projecting the deblurred estimate of the image.

7. The method according to claim 1, wherein modeling point spread functions for the pixels of the image considers motion blur using a symmetric linear motion blur kernel and lens blur using a disk kernel.

8. An apparatus for deblurring an image from a sequence of images, the image comprising pixels, wherein the apparatus comprises:
   a motion estimation stage configured to determine motion estimates of the pixels of the image;
   a point spread function modeling stage configured to model point spread functions for the pixels of the image using the determined motion estimates;
   a deconvolution stage configured to determine a deblurred estimate of the image using the modeled point spread functions; and
   a feedback loop configured to iteratively improve the determined motion estimates for the pixels by reducing a pixel's blur model magnitude by one unit in each direction until the modeled point spread functions converge.

9. The apparatus according to claim 8, wherein the motion estimation stage is configured to:
   apply a block matching algorithm to the image and temporally neighboring images from the sequence of images; and
   remove non-parallel motion estimates with a temporal coherence filter, which compares a dot product of a pixel's determined motion estimates relative to a temporally preceding image and a temporally successive image with Euclidean norms of those determined motion estimates.

10. The apparatus according to claim 9, wherein an output of the temporal coherence filter is '0' if the dot product of a determined pixel's motion estimates is smaller than a sum of the squared Euclidean norms of those motion estimates multiplied by a threshold, and wherein the output is half the sum of those determined motion estimates otherwise.

11. The apparatus according to claim 8, wherein the motion estimation stage is configured to eliminate noise from the determined motion estimates with a median filter.

12. The apparatus according to claim 8, wherein the motion estimation stage is configured to smooth an output motion field with a low-pass filter.

13. The apparatus according to claim 8, wherein the feedback loop is configured to back-project the deblurred estimate of the image.

14. The apparatus according to claim 8, wherein the point spread function modeling stage is configured to consider motion blur using a symmetric linear motion blur kernel and lens blur using a disk kernel.

15. A non-transitory computer readable storage medium having stored therein instructions enabling deblurring of an image from a sequence of images, the image comprising pixels, which when executed by a computer, cause the computer to:

determine motion estimates of the pixels of the image;
model point spread functions for the pixels of the image using the motion estimates;
determine a deblurred estimate of the image using the modeled point spread functions; and
iteratively improve the determined motion estimates for the pixels by reducing a pixel's blur model magnitude by one unit in each direction until the modeled point spread functions converge.

16. The non-transitory computer readable storage medium according to claim 15, wherein determining motion estimates of the pixels of the image comprises:
applying a block matching algorithm to the image and temporally neighboring images from the sequence of images; and
removing non-parallel motion estimates with a temporal coherence filter, which compares a dot product of a pixel's determined motion estimates relative to a temporally preceding image and a temporally successive image with Euclidean norms of those determined motion estimates.

17. The non-transitory computer readable storage medium according to claim 16, wherein an output of the temporal coherence filter is '0' if the dot product of a pixel's determined motion estimates is smaller than a sum of the squared Euclidean norms of those motion estimates multiplied by a threshold, and wherein the output is half the sum of those determined motion estimates otherwise.

18. The non-transitory computer readable storage medium according to claim 15, wherein determining motion estimates of the pixels of the image comprises eliminating noise from the determined motion estimates with a median filter.

19. The non-transitory computer readable storage medium according to claim 15, wherein determining motion estimates of the pixels of the image comprises smoothing an output motion field with a low-pass filter.

20. The non-transitory computer readable storage medium according to claim 15, wherein improving the determined motion estimates for the pixels comprises back-projecting the deblurred estimate of the image.

21. The non-transitory computer readable storage medium according to claim 15, wherein modeling point spread functions for the pixels of the image considers motion blur using a symmetric linear motion blur kernel and lens blur using a disk kernel.

* * * * *